I. O. CHILDS.
Hedge-Fence.

No. 204,197. Patented May 28, 1878.

WITNESSES:
Henry N. Miller
C. Sedgwick

INVENTOR:
I. O. Childs
BY Munn & Co
ATTORNEYS.

UNITED STATES PATENT OFFICE.

IRA O. CHILDS, OF SHREVE, OHIO.

IMPROVEMENT IN HEDGE FENCES.

Specification forming part of Letters Patent No. 204,197, dated May 28, 1878; application filed April 13, 1878.

*To all whom it may concern:*

Figure 1:
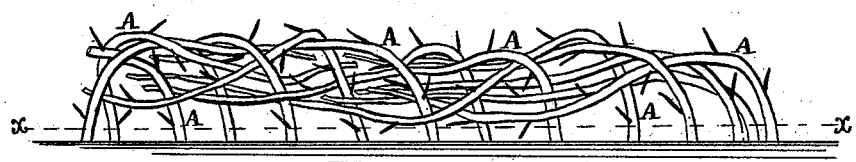
Figure 2:
Figure 3:
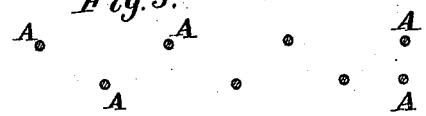

Be it known that I, IRA OLIVER CHILDS, of Shreve, in the county of Wayne and State of Ohio, have invented a new and useful Improvement in Hedge Fences, of which the following is a specification:

Figure 1 is a side view of a hedge fence, illustrating my improvement. Fig. 2 is a top view of the same. Fig. 3 is a horizontal section of the same, showing the relative position of the plants.

Similar letters of reference indicate corresponding parts.

The object of this invention is to produce a hedge fence close and thick in its lower part, so as to prevent the passage of small animals, and which may be allowed to grow to any desired height, and may be trimmed in any desired shape.

The invention consists in a hedge fence in which the plants are planted zigzag in two rows, are bent down near the ground into horizontal positions, and plaited or intertwined with each other, as hereinafter fully described.

In setting out the plants for my improved hedge, they are arranged in two rows, alternating with each other so as to form a zigzag row of plants, except at the ends of the hedgerow, where two plants are set side by side. When the plants have grown to a suitable size they are bent down alternately near the ground into horizontal positions, and are intertwined with each other, or plaited, as shown in Figs. 1 and 2, so as to make the lower part of the hedge thick and close, and thus prevent the passage of small animals. This construction also makes the upper part of the hedge thicker and closer than it would otherwise be, as the branches all grow upward, forming a thick, close hedge, which may be trimmed in any desired shape, and of any desired height.

By securing the plants in a horizontal position the formation of gaps or vacant spaces by the death of any of the plants is prevented, as the said gaps or spaces are closed by the upright shoots from the horizontal stems, thus insuring a close hedge.

Having thus described my invention, I claim as new and desire to secure by Letters Patent—

A hedge fence in which the plants A are planted zigzag, or in two rows alternating with each other, are bent down near the ground into horizontal positions, and are plaited or intertwined with each other, substantially as herein shown and described.

IRA OLIVER CHILDS.

Witnesses:
   WILLIAM W. WISE,
   WM. HUGHES.